United States Patent
Arefjord

(10) Patent No.: US 9,821,257 B2
(45) Date of Patent: Nov. 21, 2017

(54) DYNAMIC PARTICLE SEPARATOR

(71) Applicant: Anders Mathias Arefjord, Os (NO)

(72) Inventor: Anders Mathias Arefjord, Os (NO)

( * ) Notice: Subject to any disclaimer, the term of this patent is extended or adjusted under 35 U.S.C. 154(b) by 207 days.

(21) Appl. No.: 14/370,455

(22) PCT Filed: Jan. 2, 2013

(86) PCT No.: PCT/NO2013/050001
§ 371 (c)(1),
(2) Date: Jul. 2, 2014

(87) PCT Pub. No.: WO2013/103305
PCT Pub. Date: Jul. 11, 2013

(65) Prior Publication Data
US 2014/0373492 A1 Dec. 25, 2014

(30) Foreign Application Priority Data

Jan. 3, 2012 (NO) .................................. 20120004

(51) Int. Cl.
*B01D 45/08* (2006.01)
*B01D 45/16* (2006.01)
(Continued)

(52) U.S. Cl.
CPC .............. *B01D 45/16* (2013.01); *B01D 45/12* (2013.01); *B04C 5/081* (2013.01); *B04C 5/14* (2013.01);
(Continued)

(58) Field of Classification Search
CPC ........ B01D 45/16; B01D 45/12; B04C 5/185; B04C 5/18; B04C 5/14; B04C 9/00; B04C 11/00; B04C 5/081
See application file for complete search history.

(56) References Cited

U.S. PATENT DOCUMENTS

| 3,232,430 A | 2/1966 | Saint Jacques |
| 3,516,551 A * | 6/1970 | Neumann .................. B04C 5/00 |
| | | 209/732 |

(Continued)

FOREIGN PATENT DOCUMENTS

| DE | 3509191 A1 | 9/1986 |
| DE | 4136935 A1 | 5/1993 |

(Continued)

OTHER PUBLICATIONS

International Search Report mailed Apr. 11, 2013 for PCT/NO2013/050001.

(Continued)

*Primary Examiner* — Dung H Bui
(74) *Attorney, Agent, or Firm* — Ben Schroeder Law PLLC

(57) ABSTRACT

A dynamic particle separator is described for cyclone separation of sand from a gas stream in connection with petroleum related production of oil and gas, where the separator comprises a housing (14) containing as cyclone tank (4) that is equipped with an upper inlet opening (1) for the gas stream and an upper and a lower outlet opening (2,12) for export of gas and particles, respectively, from the tank (4). The cyclone tank (4) is formed, at least in an internal area around the inlet opening (1), with an upper and downwardly directed conical shape (4a) that increases in diameter, and where the upper conical shape (4a) thereafter has a transition into an inverse, lower conical shape (4b) that converges towards the lower outlet opening (12).

10 Claims, 1 Drawing Sheet

(51) Int. Cl.
  *B04C 5/081*  (2006.01)
  *B04C 9/00*   (2006.01)
  *B04C 11/00*  (2006.01)
  *B04C 5/14*   (2006.01)
  *B04C 5/18*   (2006.01)
  *B04C 5/185*  (2006.01)
  *B01D 45/12*  (2006.01)

(52) U.S. Cl.
  CPC ............... *B04C 5/18* (2013.01); *B04C 5/185* (2013.01); *B04C 9/00* (2013.01); *B04C 11/00* (2013.01)

(56) References Cited

U.S. PATENT DOCUMENTS

| | | | | |
|---|---|---|---|---|
| 3,874,738 A * | 4/1975 | Winkler | ............... | B04C 5/18 |
| | | | | 406/109 |
| 4,076,509 A * | 2/1978 | Ferm | ............... | B01D 50/00 |
| | | | | 131/302 |
| 4,094,794 A | 6/1978 | Kahmann | | |
| 4,178,801 A * | 12/1979 | Cassell | ............... | G01F 1/34 |
| | | | | 55/DIG. 34 |
| 4,225,325 A * | 9/1980 | Diehl | ............... | B04C 5/04 |
| | | | | 251/205 |
| 4,446,107 A * | 5/1984 | Buyan | ............... | B01J 8/0055 |
| | | | | 422/107 |
| 5,141,644 A * | 8/1992 | Forde | ............... | B04C 5/15 |
| | | | | 137/424 |
| 5,290,431 A * | 3/1994 | Cunningham | ............ | B01J 38/06 |
| | | | | 208/113 |
| 5,372,707 A * | 12/1994 | Buchanan | ............ | B04C 5/10 |
| | | | | 208/113 |
| 5,669,948 A * | 9/1997 | Brottg.ang.rdh | ... | B01D 19/0057 |
| | | | | 55/459.1 |
| 7,434,694 B1 | 10/2008 | Elvin | | |
| 8,029,608 B1 * | 10/2011 | Breslin | ............... | B01D 46/0086 |
| | | | | 116/212 |
| 2003/0200736 A1 * | 10/2003 | Ni | ............... | B04C 5/181 |
| | | | | 55/426 |
| 2005/0178272 A1 * | 8/2005 | Kariya | ............... | B01D 46/2418 |
| | | | | 96/421 |
| 2005/0224426 A1 | 10/2005 | Arefjord | | |
| 2007/0144115 A1 * | 6/2007 | Ni | ............... | A47L 9/1608 |
| | | | | 55/322 |
| 2008/0047091 A1 * | 2/2008 | Nguyen | ............... | A47L 9/1608 |
| | | | | 15/300.1 |
| 2010/0193414 A1 * | 8/2010 | Arefjord | ............ | B01D 21/2411 |
| | | | | 210/86 |
| 2010/0213118 A1 * | 8/2010 | Tandon | ............... | B04C 5/04 |
| | | | | 210/512.2 |
| 2010/0264088 A1 * | 10/2010 | Yilikangas | ......... | B01D 17/0217 |
| | | | | 210/665 |
| 2011/0001045 A1 * | 1/2011 | Richardson | ............ | B04C 5/14 |
| | | | | 250/286 |
| 2012/0264911 A1 * | 10/2012 | Mills | ............... | B01D 3/009 |
| | | | | 528/501 |
| 2013/0008840 A1 * | 1/2013 | Pesetsky | ............... | B01D 21/267 |
| | | | | 210/95 |
| 2013/0152796 A1 * | 6/2013 | Pawl | ............... | B01D 45/16 |
| | | | | 96/360 |
| 2013/0276629 A1 * | 10/2013 | Salahshour | ......... | B01D 46/446 |
| | | | | 95/25 |
| 2014/0174045 A1 * | 6/2014 | Sakai | ............... | B01D 45/12 |
| | | | | 55/394 |

FOREIGN PATENT DOCUMENTS

| | | |
|---|---|---|
| DE | 102008057339 A1 | 5/2010 |
| GB | 1075695 A | 7/1967 |
| SE | 424508 B | 11/1979 |
| SE | 424508 B | 7/1982 |
| WO | 0128659 A1 | 4/2001 |
| WO | 03099448 A1 | 12/2003 |
| WO | 2010089309 A1 | 8/2010 |

OTHER PUBLICATIONS

Internation Prelminary Report on Patentability mailed Jan. 7, 2014 for PCT/NO2013/050001.

* cited by examiner

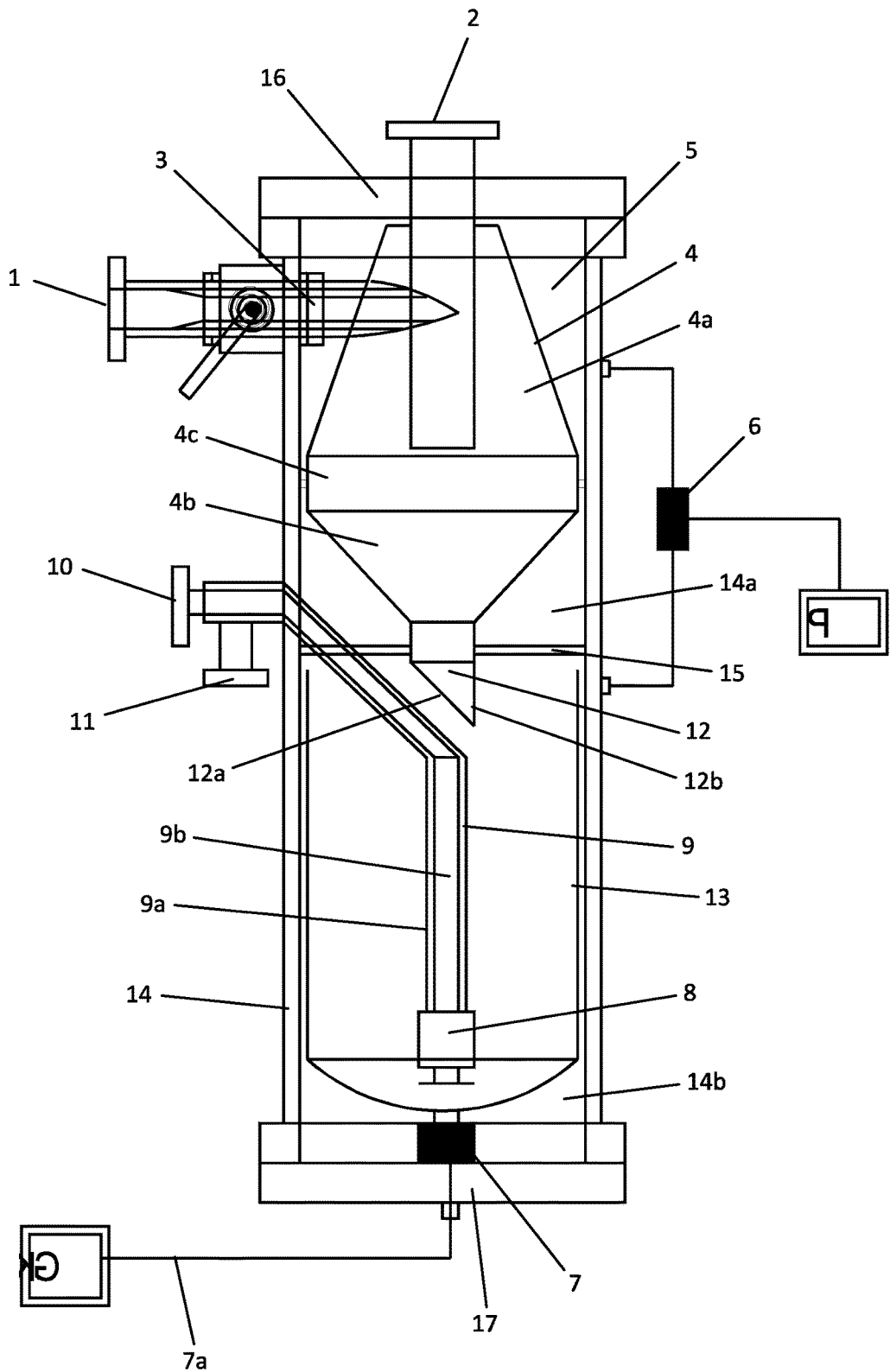

DYNAMIC PARTICLE SEPARATOR

This application claims priority under 35 USC 371 to PCT/NO02013/050001 filed Jan. 2 2013, which in turn claims priority to NO20120004, filed Jan. 3, 2012, the contents of both of which are incorporated by reference in their entireties.

The present invention relates to a dynamic particle separator for cyclone separation of sand from a gas stream in connection with petroleum related production of oil and gas, where the separator comprises a housing containing a cyclone tank that is equipped with an upper inlet opening for the gas stream and an upper and a lower outlet opening for export of gas and particles, respectively, from the tank.

In connection with petroleum related production of oil and gas, large amounts of sand can appear in gas streams that must be separated out in one way or another. This gas stream can be liquid gas, i.e. condensate, or standard gas streams under normal pressure, and contain gas, liquid, solids, contaminating matter and other impurities in the form of sand. With sand one must therefore understand the above mentioned concepts.

The are many different sand separators and most function according to the centrifugal principle where a vortex is generated so that heavier particles are thrown against an internal wall, for thereafter to fall down in an outlet, while light gases rise and are exported through an upper outlet.

Known solutions normally comprise a circular-cylindrical tank, often with a lower conical, tapering part towards the outlet for the particles. The force on the particles will thereby, in the main, be the same in the whole of the tank. Getting the particles down in the tank can, in this case, be a problem.

For oil companies, to separate particles during, for example, production of oil and gas leads to large costs and a considerable effort because the sand particles are damaging to the equipment the gas mixture is led through. This can be transport pipes or tanks on board ships and refineries. Within the processing industry particles can also lead to erosion of pipe systems and tanks, among other things, become a safety risk and also lead to blocking of filters. The equipment that has hitherto been used for the separation has been dependent on the size of the particles and on the flow velocity in the liquid and/or gas they are found in.

From the patent literature, reference is made to WO 0128659 A1 which describes a sand separator for use in gas wells that removes the sand from the gas before it is delivered to a production line. The sand separator comprises a vertical, cylindrical tank with an inner cylinder. Gas/sand is injected at a special angle down in the annular space between the inner and the outer cylinder to form a cyclone type effect so that the gas rises and flows from the top of the tank while the sand continues downwards and is accumulated in the bottom of the tank. The emptying is automated which ensures a quick opening and closing of the emptying valve and at the same time lubricates the valve while the outlet valve is in a completely open position to avoid wear.

Furthermore, reference is made to WO 03099448 A1 that describes a unit for a dynamic particle separator within production of oil and gas for separation of particles in a liquid, gas or both of these, where the separator comprises a vertical cylindrical tank which is equipped with an upper inlet opening and an upper and a lower outlet opening for export of liquid/gas and particles, respectively. Furthermore, the tank comprises a pipe-formed inner cylinder that is equipped with a series of vanes that are driven by a motor. The inner cylinder comprises a series of openings. The vanes contribute to give a centrifugal movement in the outer and the inner cylinder. Furthermore, the separator is equipped with a gas barrier to prevent that the vortex streams that are created in the tank do not go downwards in the separator.

The present particle separator for cyclone separation or centrifugal separation of particles provides several advantages with respect to known solutions. Among other things the separator is formed so that the particles are forced more outwards in the separation process. The separator is also equipped with equipment to regulate the inflow of the gas stream in the tank based on a pressure drop, and also formed to prevent the vortex flow that is formed in the tank to go downwards in the separator.

Therefore, it is an object of the invention to provide an alternative and improved particle separator with respect to known solutions.

The separator according to the invention is, in the first instance, intended to be used on top of a platform or the like but can also be used subsea.

The above mentioned object is obtained with a dynamic particle separator for cyclone separation of sand from a gas stream in connection with petroleum related production of oil and gas, where the separator comprises a housing encompassing a cyclone tank that is equipped with an upper inlet opening for the gas stream and an upper and a lower outlet opening for the export of gas and particles, respectively, from the tank, where the cyclone tank is formed, at least in an area about the inlet opening, with an upper and downwardly directed conical shape that increases in diameter and where the upper conical shape thereafter has a transition into an inverse lower conical shape that converges towards the lower outlet opening.

Alternative embodiments are given in the dependent claims.

The upper and the lower conical shapes can be separated by a circular-cylindrical belt.

The lower outlet opening of the tank can be formed as a pipe socket where the pipe socket is equipped at the bottom with an angled and leak proof end surface and with an outlet opening in the side wall of the pipe socket. The upper inlet opening of the tank can be equipped with an adjustable shutter opening arranged to regulate the velocity of the stream of gas in the cyclone tank. The shutter opening can be arranged to be adjusted based on the pressure drop over the inlet opening.

The cyclone tank is preferably arranged in an upper chamber in the housing where the chamber is closed at the bottom by a plate placed over the lower outlet opening and the upper chamber about the cyclone tank is filled and pressurised by a pressure medium, such as oil. A pressure sensor can be arranged between the upper chamber and the lower chamber, where the pressure sensor is arranged to register changes in the pressure difference as an indication of a pressure drop in the upper chamber. The pressure sensor can be connected to a display and/or alarm appliance.

The housing can comprise a lower chamber in which the lower outlet opening ends up and which is equipped with a collection bucket open at the top to receive separated particles. The collecting bucket can be placed on a load cell arranged to register the amount of collected particles in the bucket.

Furthermore, a silting device can be arranged in the collecting bucket where the silting device is connected to a pipe that extends out of the housing and where a silting process for export of particles through the pipe starts on a signal from the load cell. The pipe can be a double-walled pipe that stretches down into the bucket where an outer, longitudinally running annular space in the pipe is connected to a water inlet for the supply of water to the bucket and in which silted up particles are led out through an inner part of the pipe and out via an outlet.

The silting up process can be controlled externally by a control device where the control device regulates the supply of water, the silting up of particles and the export of particles and water.

The invention shall now be explained in more detail with the help of the enclosed figure, in which:

FIG. 1 shows a principle outline of the invention.

As an embodiment example FIG. 1 shows a housing 4 in the form of, for example, a pressure container which is divided into an upper chamber 14a and a lower chamber 14b. The two chambers can be separated by a barrier or a plate 15 and comprise a top cover 16 and a bottom plate 17, respectively.

A cyclone tank 4 is arranged in the upper chamber 14 where the tank is connected to an upper inlet 1 for the gas stream and an upper outlet 2 for gas and a lower outlet 12 for particles. For the regulation of the flow velocity through the inlet 1, the inlet can be equipped with a shutter opening 3 that regulates the velocity because of a pressure drop over the opening. A limit of 5 bar, for example, can be set, where a value above 5 bar leads to the velocity being reduced. The shutter opening 3 can be formed to regulate the "light opening" by, for example, having adjustable plates that can move in relation to each other, or pieces of pipe with slits that move mutually in the longitudinal direction in relation to each other.

To increase the force on the particles downwards, the cyclone tank 4 is formed with an upper inverted conical part 4a that increases in diameter downwards. This upper part 4a is placed in the area at the inlet 1 for the gas stream and extends downwards in the upper chamber 14a. The lower part of the tank 4 can be equipped with a conical or tapering part in a known way that converges towards the lower inlet 12 for the export of the particles. A belt 4c in the form of a circular-cylindrical part with a straight side wall is preferably placed between the two parts 4a, 4b, where this belt 4c helps to improve the path of the particles towards the outlet. The lower outlet 12 extends through the plate 15 that separates the two chambers 14a, 14b in the housing 14.

Because of the force of the particles against the inner wall of the tank, wear and tear of the tank 4 can occur, which in the end can lead to cracks or holes in the tank. Such wear and tear or leaks can normally be difficult to discover and consequently lead to a considerably reduced separation capacity and other problems. For this reason the present particle separator can be equipped with a control system for wear and tear or leaks. This can be carried out in that the upper chamber 14a, about the cyclone tank 4, is pressurised with the help of a pressure medium such as oil, where the pressure or the pressure difference to the lower chamber 14b can be monitored with the help of a pressure sensor 6. For example, the overpressure can be set at 2 bar, or any other wanted overpressure. If holes appear in the tank, the pressure will drop and the pressure sensor will emit a signal. The pressure sensor can also be connected with a display P or other signal provider for reading or setting off an alarm.

In some known solutions, the vortex that is formed in the cyclone tank can spread downwards in the housing, something which is not wanted. Therefore, the lower outlet 12 can be formed as a pipe socket where the end surface 12a of the bottom is at an angle and leak proof and with an outlet opening 12b in the side wall of the pipe socket. The vortex stream will thereby be broken against the end surface 12a The lower chamber 14b preferably comprises a collection unit 13 in the form of, for example, a collecting bucket 13 that is open at the top so that sand and anything else that comes out through the outlet 12 falls down into the bucket 13. The bucket 13 can rest on a load cell 7, or the like, which is arranged to weigh the amount of sand or other material that has ended up in the bucket 13. When the collecting bucket 13 has received a given amount of sand it must be emptied. The emptying of the sand or other material is carried out manually in that the load cell 7 sends a signal 7a about the number of kg that has been collected to an operator who thereafter starts an emptying out process or silting up process, or the signal can automatically initiate said process with the help of a control system.

Therefore, a silting device 8 can be placed in the collecting bucket 13. Silting means here that the sand is mixed with the water so that the mixture can be exported from the collecting bucket and out of the housing 14. The silting device 8 is connected to a pipe 9 that extends out of the housing 14 and when receiving water, the water gushes out from the lower part of the collecting bucket 13 and mixes with the sand. As can be seen in the FIGURE, the pipe 9 stretches or extends down into the bucket 13. The water is received via a water inlet 11 externally to the housing 14 and can be seawater or fresh water. The water is led on from the water inlet via the pipe 9 where the pipe 9 preferably comprises a double walled pipe with an outer, longitudinally running annular space 9a for the supply of water and an inner bore or part 9b for the transport of sand and water out through an outlet 10 Furthermore the outlet 10 can be connected to other pipes or appliances for further treatment of the sand.

Alternatively, two pipes can be used instead of one double walled pipe, i.e. a separate pipe for the inflow of water and a separate pipe for the export of water and sand. However, the use of a double walled pipe will mean a space saving and is to be preferred.

The silting up process can be controlled externally by a control device, where the control device regulates the supply of water, the silting up of the particles and the export of particles and water.

The invention claimed is:

1. Dynamic particle separator for cyclone separation of sand from a gas stream in connection with petroleum related production of oil and gas, where the dynamic particle separator comprises a housing containing a cyclone tank that is equipped with an upper inlet opening for a gas stream and an upper and a lower outlet opening for export of gas and particles, respectively, from the cyclone tank wherein the cyclone tank is formed, at least in an internal area around the upper inlet opening, with an upper and downwardly directed conical shape that increases in diameter, and where an upper conical shape thereafter has a transition into an inverse, lower conical shape, that converges towards the lower outlet opening and the housing comprises a lower chamber, in which the lower outlet opening ends up, and which is equipped with a collecting bucket with an open top for collection of separated particles, wherein the collecting bucket is placed in a load cell to register an amount of collected particles in the collecting bucket, and a silting device is placed in the collecting bucket, where the silting device is connected to a pipe that runs out of the housing and where a silting process for export of particles through the pipe starts on a signal from the load cell; wherein the pipe is a double walled pipe that extends down into the bucket, where an outer, longitudinally running annular space of the pipe is connected to a water inlet for supply of water to a bucket and in which separated particles are exported through an inner part of the pipe and out via an outlet; and wherein the silting process is arranged to be controlled externally by a control device, where the control device regulates the supply of water, a silting up of particles and export of particles and water.

2. The dynamic particle separator according to claim 1, wherein the upper conical shape and lower conical shape are separated by a circular-cylindrical belt.

3. The dynamic particle separator according to claim 1, wherein the lower outlet opening is formed as a pipe socket, where the pipe socket is equipped at a bottom with an angled and leak proof end surface and with an outlet opening in a side wall of the pipe socket.

4. The dynamic particle separator according to claim 1, wherein the silting process is arranged to be controlled externally by a control device, where the control device regulates the supply of water, a silting up of particles and export of particles and water.

5. The dynamic particle separator according to claim 1, wherein the upper inlet opening is equipped with an adjustable shutter opening arranged to regulate a speed of the gas stream in the cyclone tank.

6. The dynamic particle separator according to claim 5, wherein a shutter opening is arranged to be adjusted based on a pressure drop over the inlet opening.

7. The dynamic particle separator according to claim 1, wherein the cyclone tank is arranged in an upper chamber in the housing where a chamber is closed at a bottom by a plate placed over the lower outlet opening, and where the upper chamber, about the cyclone tank is filled and pressurised by a pressure medium.

8. The dynamic particle separator according to claim 7 wherein a pressure sensor is placed between the upper chamber and a lower chamber, where the pressure sensor is arranged to register changes in a pressure difference as an indication of a pressure drop in the upper chamber.

9. The dynamic particle separator according to claim 8, wherein the pressure sensor is connected to a display and/or an alarm appliance.

10. The dynamic particle separator according to claim 7, wherein the pressure medium is oil.

* * * * *